US008186651B2

(12) United States Patent
Dowling

(10) Patent No.: US 8,186,651 B2
(45) Date of Patent: May 29, 2012

(54) CONVEYOR BELT LIFTING DEVICE

(76) Inventor: John Dowling, Brakpan (ZA)

( * ) Notice: Subject to any disclaimer, the term of this patent is extended or adjusted under 35 U.S.C. 154(b) by 44 days.

(21) Appl. No.: 12/783,884

(22) Filed: May 20, 2010

(65) Prior Publication Data
US 2010/0224845 A1 Sep. 9, 2010

Related U.S. Application Data

(63) Continuation-in-part of application No. PCT/IB2008/000787, filed on Apr. 2, 2008.

(51) Int. Cl.
B66F 3/00 (2006.01)
B66F 3/35 (2006.01)

(52) U.S. Cl. ..... 254/903; 254/124; 254/126; 254/93 HP

(58) Field of Classification Search ............. 254/133 R, 254/124, 126, 134, 93 HP
See application file for complete search history.

(56) References Cited

U.S. PATENT DOCUMENTS

| 4,977,999 A | 12/1990 | Smock |
| 5,481,774 A | 1/1996 | Hodges et al. |
| 6,109,428 A | 8/2000 | Harm |
| 2004/0181156 A1 | 9/2004 | Kingsford et al. |

FOREIGN PATENT DOCUMENTS

GB 2152895 A * 8/1985

OTHER PUBLICATIONS

PCT Search Report dated Nov. 10, 2008.

* cited by examiner

Primary Examiner — Monica Carter
Assistant Examiner — Seahee Yoon
(74) Attorney, Agent, or Firm — Thomas, Kayden, Horstemeyer & Risley, LLP

(57) ABSTRACT

A conveyor belt lifting device for use on a belt-type conveyor comprising a conveyor belt supported by a support structure includes an inflatable bag and is operable between a retracted condition in which the inflatable bag is deflated and an operative condition in which the inflatable bag is inflated and its operably upper surface adopts a shape generally to conform to an underside of the conveyor belt. The invention extends to a method for providing access to components of a belt-type conveyor comprising a conveyor belt supported by a support structure.

13 Claims, 4 Drawing Sheets

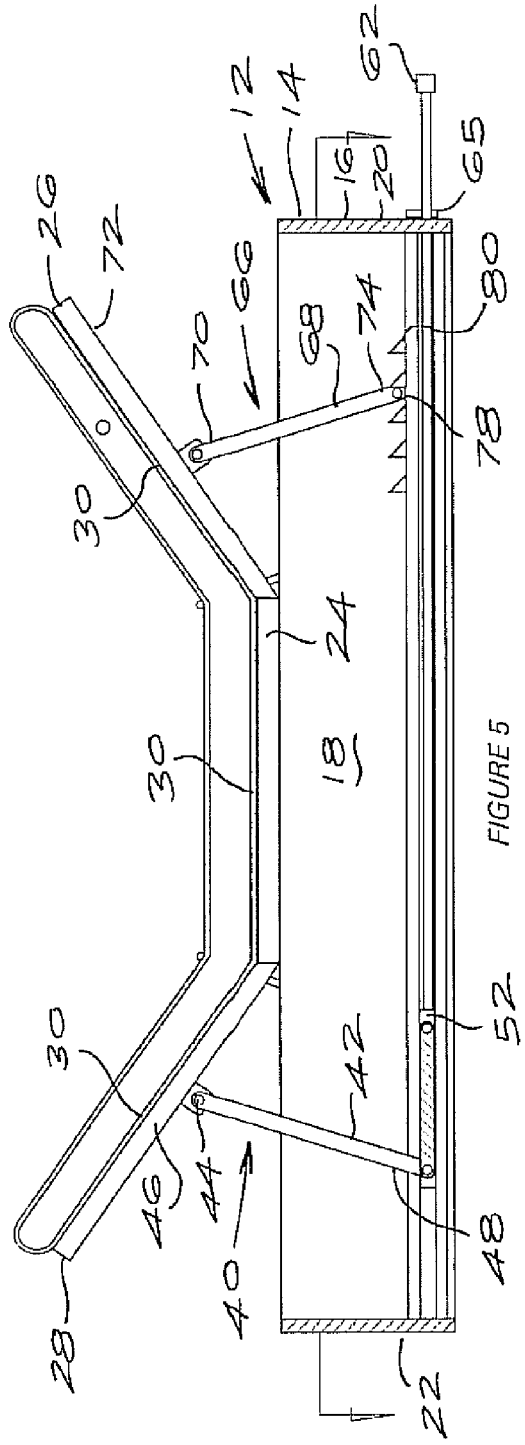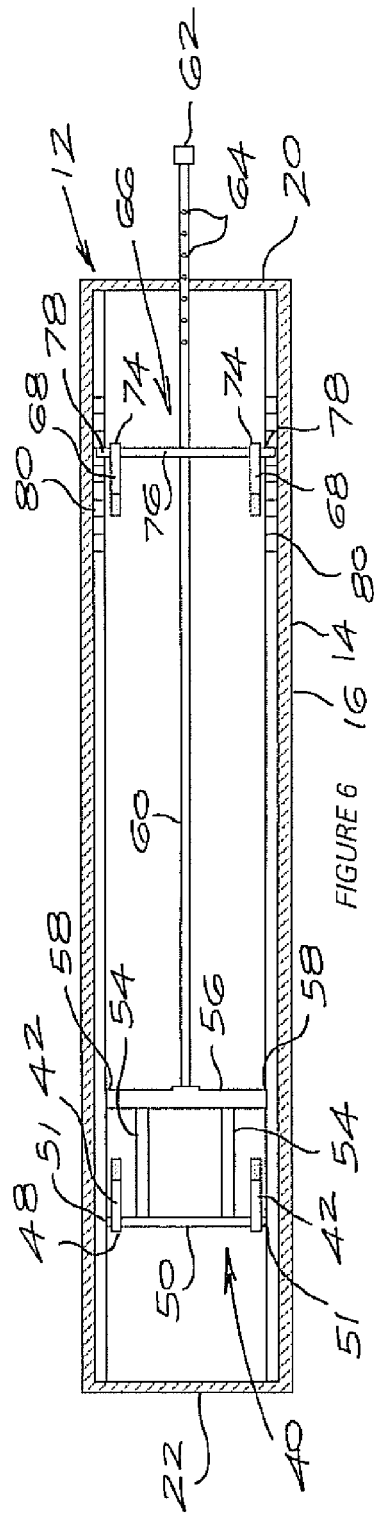

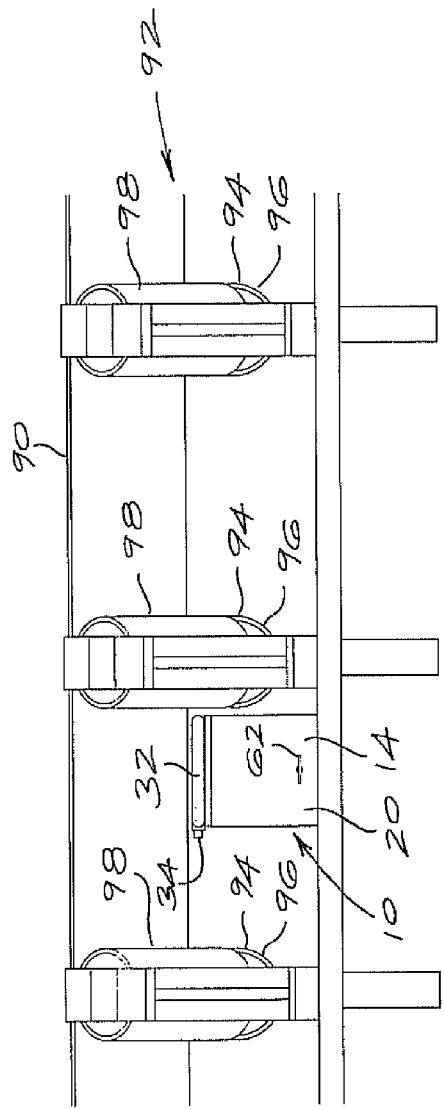
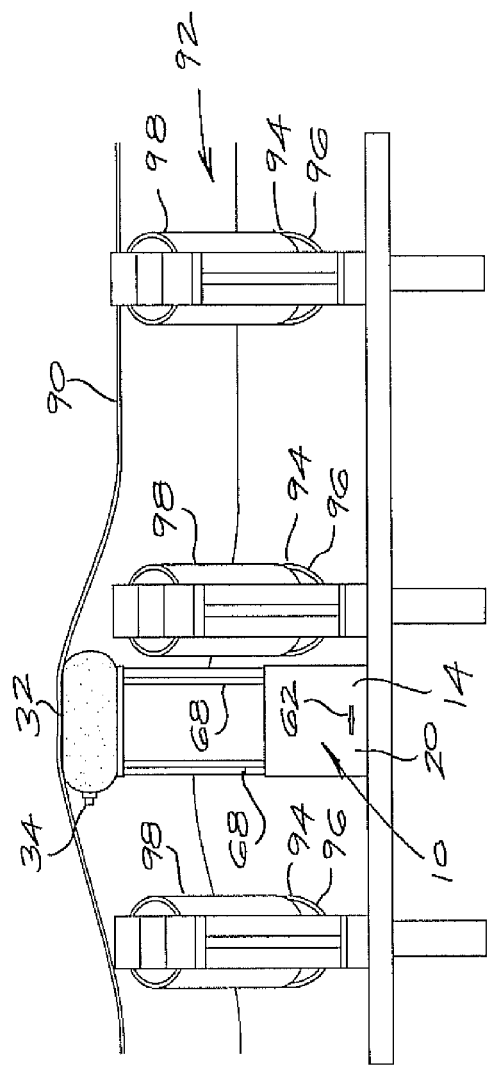

CONVEYOR BELT LIFTING DEVICE

CROSS REFERENCE TO RELATED APPLICATION

This application is a continuation application of International Patent Application PCT/IB2009/000787 filed on 2 Apr. 2008 entitled "Conveyor Belt Lifting Device."

FIELD OF THE INVENTION

This invention relates to conveyors. More particularly, this invention relates to conveyors of the belt type. In particular, the invention relates to a device for lifting a belt of a conveyor of the belt type from a supporting conveyor substructure to facilitate maintenance on the conveyor system.

BACKGROUND OF THE INVENTION

Conveyors of various sorts are ubiquitous in industry. Various types of conveyors are known, but belt conveyors are extremely common and are used for the transport of large quantities of goods. Such conveyors commonly comprise a supporting framework on which an endless belt is supported. The belt is directly supported on rollers, which may be driving rollers or idler rollers. These rollers are generally cylindrical in shape and are rotatably supported on a bearing shaft or on stub axles for rotation about their longitudinal axes. Where products such ores or minerals are conveyed in large quantities, the conveyor is often shaped so that when viewed in profile it has a trough or dished shape. This requires that the driving and idler rollers are configured to maintain the belt in this shape.

Of course, conveyor systems, particularly those in use in conveying heavy goods such as ores or minerals, are subject to breakdown and require maintenance. In order to perform this maintenance on the belt, rollers, roller bearings or framework of the conveyor, it has in the past been necessary to stop the conveyor, remove the goods being transported by the conveyor from a substantial portion thereof and then to lift the belt so as to repair the belt itself or to gain access to the roller or rollers systems or framework. This requires the use of substantial labour and leads to significant down-time for the conveyor. Accordingly, it would be an advantage to provide a device to facilitate the maintenance of a belt type conveyor without having to remove large quantities of goods from the conveyor and without requiring the dismantling of large sections of the conveyor. It will also be appreciated that belt type conveyors are often accessible from one side of the conveyor only, by way of a walkway or the like. It would therefore be a further advantage to provide that the said device were operable from one proximal side of the conveyor without the need to access the distal side of the conveyor.

OBJECT OF THE INVENTION

It is an object of this invention to provide a conveyor belt lifting device, which will, at least in part, obviate the problems set out above and achieve the advantages stated.

SUMMARY OF THE INVENTION

According to a first aspect of the invention there is provide a conveyor belt lifting device for use on a belt-type conveyor comprising a conveyor belt supported by a support structure, the device including an inflatable bag and being operable between a retracted condition in which the inflatable bag is deflated and an operative condition in which the inflatable bag is inflated and its operably upper surface adopts a shape generally to conform to an underside of the conveyor belt.

The operably upper surface of the inflatable bag may adopt a troughed shape on inflation.

The conveyor belt lifting device may include
a frame on which the inflatable bag is supported;
the frame being selectively variable in shape and configuration thereby to selectively vary the shape adopted by the operably upper surface of the inflatable bag on inflation thereof.

The frame may comprise a plurality of frame sections, each of which is variably angularly displaceable with respect to its neighbouring frame sections. In a preferred embodiment of the invention, the frame includes three inter-connected frame sections, being first and second outer frame sections and an intermediate frame section, each of the frame sections defining a bearing surface for supporting a portion of the inflatable bag and the first and second outer frame sections being pivotally connected to the intermediate frame section and pivotally displaceable between a retracted condition in which its bearing surface is co-planar with that of the intermediate frame section and an extended condition in which its bearing surface is angled with respect to the bearing surface of the intermediate frame section.

The conveyor belt lifting device may include means for displacing at least one of the outer frame sections between its retracted and extended conditions. Further, the device may include locking means for releasably locking the frame sections in their extended conditions.

In a preferred embodiment of the invention, the frame comprises a static support frame on which the first, second and intermediate frame sections are mounted and which includes a first displacement means, the first displacement means comprising a pair of arms, a first end of each of which is pivotally mounted to a respective side of the first outer frame section at the distal end of the device and a second end of which is slidably mounted in a slide mounted on the static support frame generally co-parallel with the support surface of the intermediate frame section; and an actuator connected to the arms and operable from the proximal end of the device.

The conveyor belt lifting device may further include a second displacement means comprising a pair of arms, a first end of each of which is pivotally mounted to a respective side of the second outer frame section at the proximal end of the device and a second end of which is connected to a cross member joining the first and second arms; and a pair of toothed members each of which is mounted in register with each other on the static support frame generally co-parallel with the support surface of the intermediate frame section, the cross member being engageable ratchet-fashion with selected pairs of teeth of the toothed members.

The conveyor belt lifting device may include retaining means for retaining the inflatable bag in contact with the support surfaces of the frame sections when in its inflated condition. Then, the retaining means may comprise a pair of straps, ends of each of which are connected to the support frame on opposed sides thereof and at the intersection between the intermediate frame section and a respective one of the first and second outer frame sections, the straps being tensioned to retain the inflatable bag in abutment with the support frame when in its inflated condition.

According to a second aspect of the invention there is provided a method for providing access to components of a belt-type conveyor comprising a conveyor belt supported by a support structure, the method including positioning a conveyor belt lifting device, the device including an inflatable bag and being operable between a retracted condition in which the inflatable bag is deflated and an operative condition in which the inflatable bag is inflated and its operably upper surface adopts a shape generally to conform to an underside of the conveyor belt; and configuring the conveyor belt lifting device in its operative condition, thereby to lift at least a portion of the conveyor belt from its support structure.

The conveyor belt lifting device of the method may be as hereinbefore described.

BRIEF DESCRIPTION OF THE DRAWINGS

The invention is now described, by way of example, with reference to the accompanying diagrammatic drawings. In the drawings:

FIG. 5 shows a sectional side view of the device in its retracted condition, as depicted in FIG. 4;

FIG. 6 shows a sectional top plan view of the device as depicted in FIG. 4;

FIG. 7 shows a side view of the device as depicted in FIG. 2; and

FIG. 8 shows a side view of the device in its operative condition, as depicted in FIG. 4.

DETAILED DESCRIPTION OF THE DRAWINGS

Figure 1:
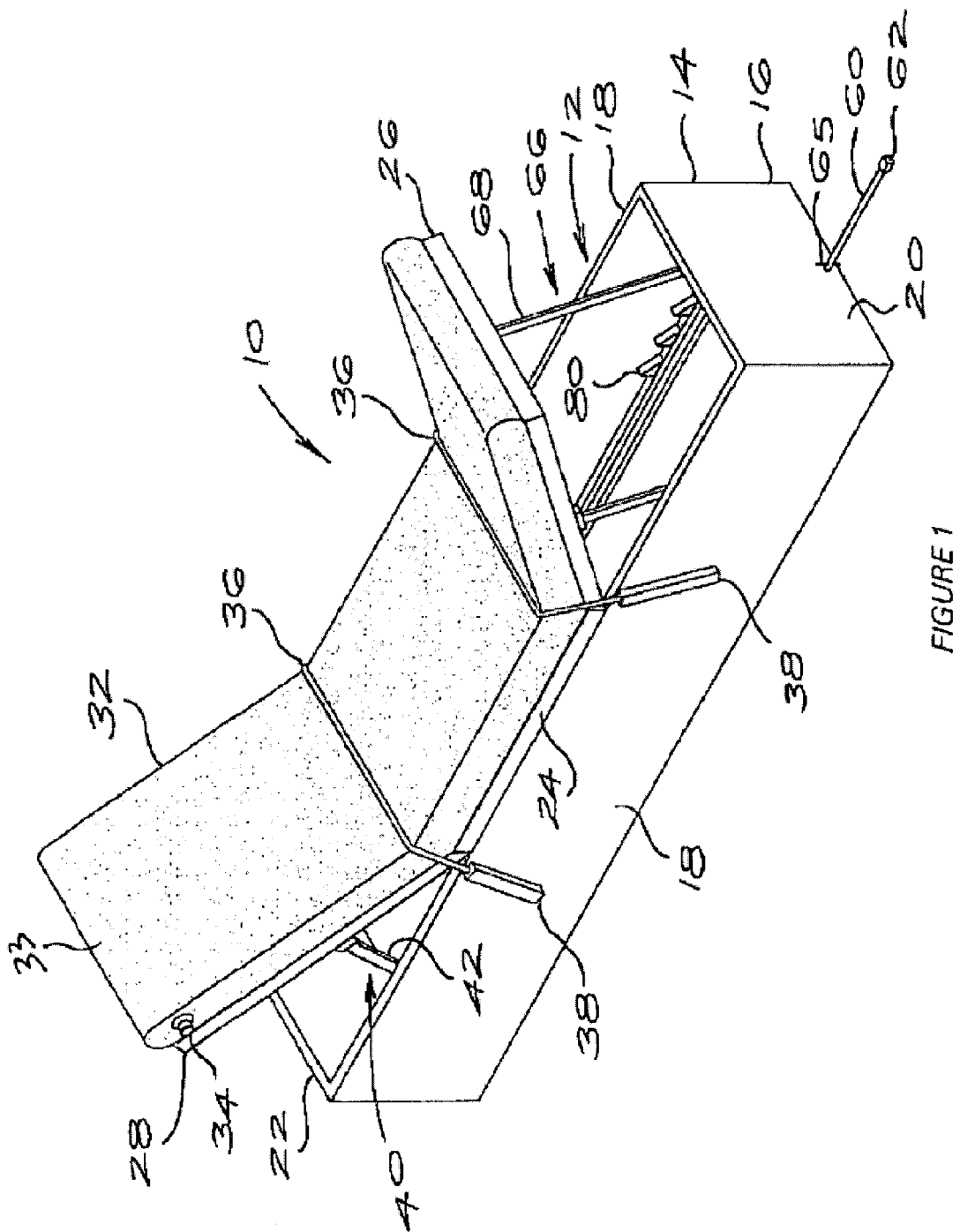
FIG. 1 shows a perspective view of the conveyor belt lifting device in accordance with the invention in its operative condition.

In the drawings, reference numeral 10 generally refers to a conveyor belt lifting device in accordance with the invention.

The device 10 has a frame 12, which includes a static support frame 14 in the form of an open-topped box 16 having opposed long sides 18 and opposed proximal and distal short sides 20 and 22, respectively. An intermediate frame section 24 is mounted fast with the static support frame 14. First and second outer frame sections 26 and 28, respectively, are pivotally mounted to the static support frame 14 so that the first and second frame sections 26,28 and the intermediate frame section 24 are positioned end to end. Each of the frame sections 24,26,28 defines a support surface 30 and an inflatable bag 32, generally in the shape of a cushion of substantially the same dimensions as the combined dimensions of the support surfaces 30 of the frame sections 24,26,28, is supported on the support surfaces 30 thereof. The inflatable bag 32 has a two-way valve 34 via which it may be inflated with air and subsequently deflated, as required. In one embodiment, the inflatable baq 32 includes a first surface 33 that may adopt a shape to substantially conform to an underside of the conveyor belt when the inflatable baq 32 is inflated. A pair of retaining straps 36 is mounted on the static support frame 14, ends 38 of each strap being attached to respective long sides 18 thereof, and the straps passing over the inflatable bag 32. The retaining straps 36 are adjustable and may be spring loaded so that they retain the inflatable bag 32 in its position in contact with the frame sections 24,26,28, particularly when the device 10 is in use and the inflatable bag 32 is in its inflated condition (as best seen in FIG. 4).

Figure 2:
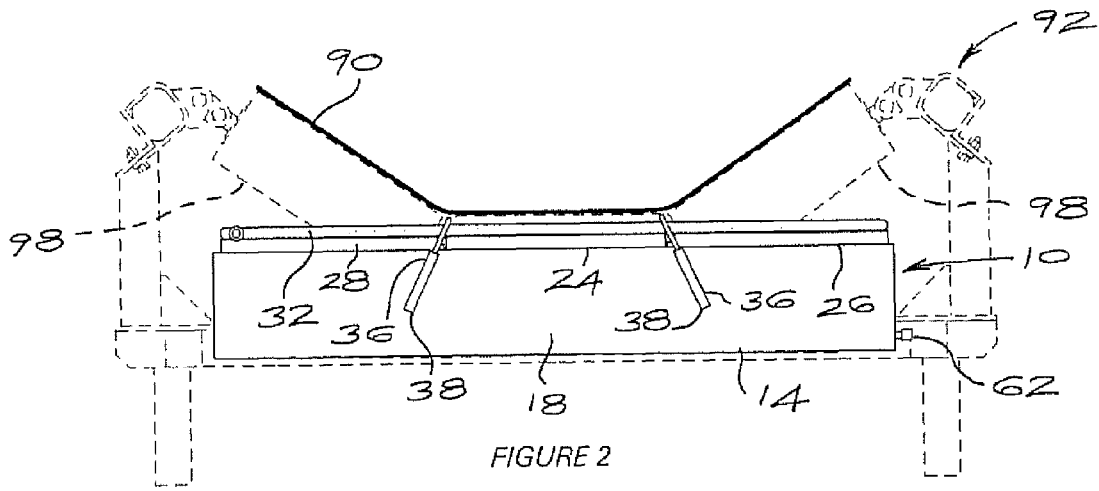
FIG. 2 shows a side view of the device in position for use on a belt type conveyor.
Figure 3:
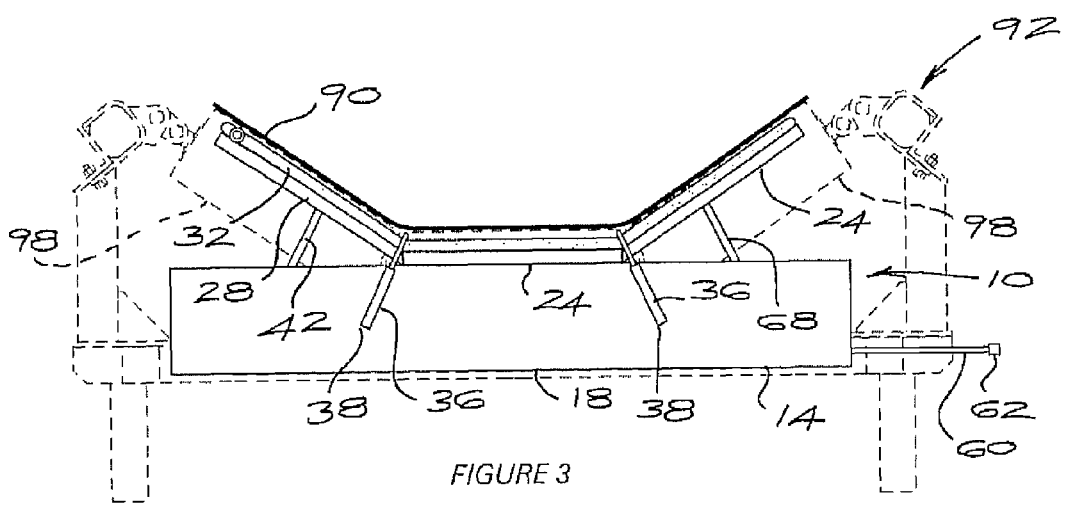
FIG. 3 shows the device of FIG. 2 in a first stage of operation, with its inflatable bag in a deflated condition.
Figure 4:
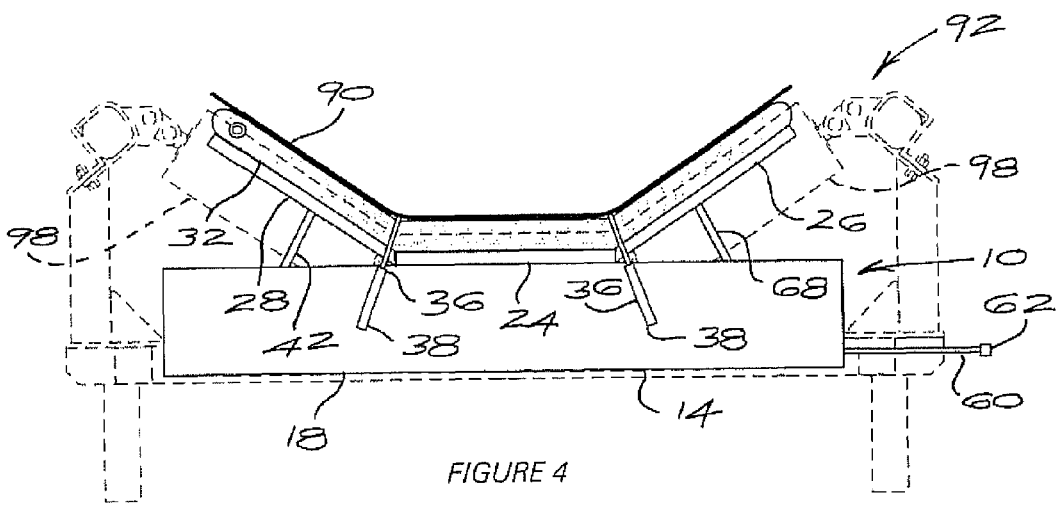
FIG. 4 shows the device of FIG. 2 in a second stage of operation with its inflatable bag in an inflated condition.

Further, the device 10 has a displacement system 40 (shown in FIGS. 4 and 5) for displacing the second frame section 28 between its retracted and extended conditions, the retracted condition being illustrated in FIG. 2 and the extended conditions being illustrated in FIGS. 3 and 4. The displacement system 40 comprises a pair of arms 42, first ends 44 of each of which are pivotally attached to opposed sides 46 of the second frame section 28 and second ends 48 of which are pivotally mounted on a sliding member 50, ends 51 of which slide within rails 52 attached to respective long sides 18 of the static support frame 14. The sliding member 50 is connected by means of two cross members 54 to a second sliding member 56, ends 58 of which also slide in the respective rails 52. An actuator 60 is connected a mid-point of the second sliding member 56 and passes through an aperture in the proximal short side 20, terminating in a handle 62. The actuator 60 is manually operable to slide the sliding members 50,56 in tandem within the rails 52 and thereby to selectively lift and lower the second frame section 28. Further, the actuator 60 has a series of locating holes 64 and it may be locked in a desired position by slotting a peg (65) into a selected one of the locating holes 64 when the desired elevation of the second frame section 28 is attained.

Adjacent the proximal short side 20 of the static support frame 14, a second displacement system 66 (also shown in FIGS. 5 and 6) is located. As with the first displacement system 40, the second displacement system 66 comprises a pair of arms 68, first ends 70 of each of which are pivotally mounted to opposed sides 72 of the first outer frame section 26 and second ends 74 of which are joined by means of a cross-member 76, free ends 78 of which protrude beyond the arms 68. A pair of toothed rails 80 are fixed one to each inner surface of the long sides 18 of the static support frame 14, the teeth of the respective toothed rails 80 being in register. Then the first outer frame section 26 may be manually lifted and locked in a desired position by locating the free ends 78 of the cross-member 76 in respective recesses created by neighbouring pairs of teeth, in a well-known ratchet-fashion.

In use, the device 10 in its retracted condition and with the inflatable bag 32 deflated, is slid beneath the conveyor belt 90 of a belt type conveyor 92 proximal a set of rollers 94, as best seen in FIG. 7. In this case, the conveyor 92 comprises a typical ore carrying conveyor with a plurality of idler roller sets 94, each set of idler rollers 94 comprising a single central generally horizontally mounted roller 96 and two outer upwardly angled rollers 98, thereby maintaining the conveyor belt 90 in a trough-like configuration. The conveyor belt lifting device 10 is then manipulated and the first and second outer frame sections 26 and 28 angularly displaced until the intermediate frame section 24 of the device 10 is immediately below the central horizontal portion of the conveyor belt 90 and the outer frame sections 26,28 are each proximal the angled portions of the conveyor belt 90. Once in place, the inflatable bag 32 is inflated to lift the conveyor belt 90 from contact with the idler roller set 94 requiring maintenance, ie that adjacent to which the lifting device 10 has been positioned. The idler roller set 94 may be worked on or even removed and replaced with the conveyor belt 90 in this condition and without having to remove a substantial amount of the ore load from the conveyor belt 90. When maintenance is complete, the inflatable bag 32 is deflated, the outer frame sections 26,28 are moved to their retracted positions and the belt lifting device 10 is then slid out from beneath the conveyor belt 90.

It will be appreciated that many large conveyor systems have a walk-way located on one side of the conveyor belt 90, but not necessarily on both sides thereof. Thus, the conveyor belt lifting device 10 of the embodiment illustrated in the drawings is operable from one side, ie the side adjacent to the walk-way. Both displacement systems 40,66 may be operated from one side of the static support frame 14, thereby obviating the need to work from both sides of the belt-type conveyor 92. It will be appreciated that the displacement systems 40,66 are not the only means of displacing the outer frame sections 26,28 and that any suitable means may be used without departing from the scope of the invention. Thus, for example, the displacement systems may be pneumatically, hydraulically or electrically driven and may be designed to suit such power sources. By means of this invention there is provided a conveyor belt lifting device 10, which is simple and permits maintenance to be carried out on a belt type conveyor 92 without the need to unload the system. The device 10 is configurable to cope with varying sizes of conveyor belts having varying cross-sectional configurations.

The invention claimed is:

1. A conveyor belt lifting device for use on a belt-type conveyor comprising an inflatable bag having a first surface, the device being operable between a retracted condition in which the inflatable bag is deflated and an operative condition in which the inflatable bag is inflated, wherein the first surface adopts a shape to substantially conform to an underside of the conveyor belt.

2. The conveyor belt lifting device of claim 1, wherein the first surface of the inflatable bag adopts a troughed shape on inflation.

3. The conveyor belt lifting device of claim 1 further comprising:
   a frame on which the inflatable bag is supported, the frame being selectively variable in shape and configuration thereby to selectively vary the shape adopted by the first surface of the inflatable bag on inflation.

4. The conveyor belt lifting device of claim 3, wherein the frame further comprises a plurality of frame sections, each of the plurality of frame sections being angularly displaced with respect to its neighboring frame sections.

5. The conveyor belt lifting device of claim 4, the frame further comprising three inter-connected frame sections having a bearing surface for supporting a portion of the inflatable bag: a first outer frame section, a second outer frame section and an intermediate frame section, wherein the first outer frame section and the second outer frame section are pivotally connected to the intermediate frame section and pivotally displaced between a the retracted condition in which its bearing surface is co-planar with that of the intermediate frame section and an extended condition in which its bearing surface is angled with respect to the bearing surface of the intermediate frame section.

6. The conveyor belt lifting device of claim 5, further comprising means for displacing at least one of the outer frame sections between its retracted and extended conditions.

7. The conveyor belt lifting device of claim 6, further comprising locking means for releasably locking the frame sections in their extended conditions.

8. The conveyor belt lifting device of claim 5,
   the frame further comprising a static support frame on which the first outer frame section, the second outer frame section and the intermediate frame sections are mounted and which includes a first displacement means, the first displacement means comprising:
   a pair of arms having a first end and a second end, the first end being pivotally mounted to a respective side of the first outer frame section at a distal end of the device and the second end being slidably mounted in a slide mounted on the static support frame substantially co-parallel with a support surface of the intermediate frame section; and
   an actuator connected to the arms and operable from a proximal end of the device.

9. The conveyor belt lifting device of claim 8, further including a second displacement means comprising:
   a pair of arms having a first end and second end, the first end being pivotally mounted to a respective side of the second outer frame section at the proximal end of the device and the second end being connected to a cross member joining the pair of arms; and
   a pair of toothed members each of which is mounted in register with each other on the static support frame substantially co-parallel with the support surface of the intermediate frame section, the cross member being engageable ratchet-fashion with selected pairs of teeth of the toothed members.

10. The conveyor belt lifting device of claim 5, further comprising retaining means for retaining the inflatable bag in contact with support surfaces of the frame sections when in its inflated condition.

11. The conveyor belt lifting device of claim 10, wherein the retaining means comprises a pair of straps having two ends, each end of each strap is connected to the support frame on opposed sides thereof and at the intersection between the intermediate frame section and a respective one of the first and second outer frame sections, each of the straps being tensioned to retain the inflatable bag in abutment with the support frame when in its inflated condition.

12. A method for providing access to components of a belt-type conveyor, the method comprising:
   positioning a conveyor belt lifting device, the device including an inflatable bag operable between a retracted condition in which the inflatable bag is deflated and an operative condition in which the inflatable bag is inflated, the inflatable bag having an upper surface that adopts a shape to substantially conform to an underside of the conveyor belt; and
   configuring the conveyor belt lifting device in its operative condition, thereby to lift at least a portion of the belt-type conveyor.

13. A method for providing access to components of a belt-type conveyor, the method comprising:
   positioning a conveyor belt lifting device, the device including an inflatable bag operable between a retracted condition in which the inflatable bag is deflated and an operative condition in which the inflatable bag is inflated, the inflatable bag having an upper surface that adopts a shape to substantially conform to an underside of the conveyor belt; and
   configuring the conveyor belt lifting device in its operative condition, thereby to lift at least a portion of the belt-type conveyor, wherein the conveyor belt lifting device is as claimed in any one of claims 2 to 11.

* * * * *